(12) United States Patent
Li et al.

(10) Patent No.: US 11,792,891 B2
(45) Date of Patent: Oct. 17, 2023

(54) MULTIPLEXING CAPABILITY SIGNALING FOR INTEGRATED ACCESS AND BACKHAUL (IAB) NODES

(71) Applicant: Intel Corporation, Santa Clara, CA (US)

(72) Inventors: Qian Li, Beaverton, OR (US); Lili Wei, Portland, OR (US); Geng Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 17/088,684

(22) Filed: Nov. 4, 2020

(65) Prior Publication Data

US 2021/0051768 A1   Feb. 18, 2021

Related U.S. Application Data

(60) Provisional application No. 62/930,442, filed on Nov. 4, 2019.

(51) Int. Cl.
| | |
|---|---|
| *H04W 88/14* | (2009.01) |
| *H04W 8/24* | (2009.01) |
| *H04W 76/27* | (2018.01) |
| *H04W 72/50* | (2023.01) |

(52) U.S. Cl.
CPC ............ *H04W 88/14* (2013.01); *H04W 8/24* (2013.01); *H04W 72/535* (2023.01); *H04W 76/27* (2018.02)

(58) Field of Classification Search
CPC ... H04W 88/14; H04W 76/27; H04W 72/535; H04W 8/24

USPC ......................................................... 370/329
See application file for complete search history.

(56) References Cited

U.S. PATENT DOCUMENTS

| | | | |
|---|---|---|---|
| 2019/0373627 A1* | 12/2019 | Luo .................. | H04W 72/54 |
| 2022/0015093 A1* | 1/2022 | Ying ................. | H04W 72/0446 |
| 2022/0287123 A1* | 9/2022 | Tiirola ............... | H04W 76/15 |
| 2022/0345285 A1* | 10/2022 | You .................. | H04L 5/14 |

OTHER PUBLICATIONS

3GPP TSG RAN WG1 #98b R1-1910902 Oct. 2019 (Year: 2019).*
3GPP TSG RAN WG1 #98b R1-1910051 Oct. 2019 (Year: 2019).*
3GPP TSG RAN WG1 #98b R1-1910466 Oct. 2019 (Year: 2019).*
3GPP TSG RAN WG1 #98 R1-1908036 Aug. 2019 (Year: 2019).*

* cited by examiner

*Primary Examiner* — William Nealon
(74) *Attorney, Agent, or Firm* — Schwegman Lundberg & Woessner, P.A.

(57) ABSTRACT

To configure an IAB node for multiplexing communications within an IAB network, processing circuitry is to encode configuration signaling for transmission to a CU function of an IAB donor node. The configuration signaling indicates a multiplexing capability of the IAB node. RRC signaling from the CU function of the IAB donor node is decoded. The RRC signaling configures scheduling resources for a parent backhaul link between the MT function of the IAB node and a DU function of a parent IAB node based on the multiplexing capability of the MT and DU functions of the IAB node. Uplink data is encoded for transmission to the parent IAB node by the MT function using to the scheduling resources for the parent backhaul link. Transmission of the uplink data is multiplexed with transmission or reception of data by the DU function of the IAB node based on the multiplexing capability.

20 Claims, 8 Drawing Sheets

MULTIPLEXING CAPABILITY SIGNALING FOR INTEGRATED ACCESS AND BACKHAUL (IAB) NODES

PRIORITY CLAIM

This application claims the benefit of priority under 35 U.S.C. 119(e) to the U.S. Provisional Patent Application Ser. No. 62/930,442, filed Nov. 4, 2019, and entitled "SIGNALING OF THE MULTIPLEXING CAPABILITY FOR INTEGRATED ACCESS AND BACKHAUL (IAB) NODES," which provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for signaling of multiplexing capabilities for integrated access and backhaul (AB) nodes operating in IAB networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for signaling of multiplexing capabilities for IAB nodes operating in IAB networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
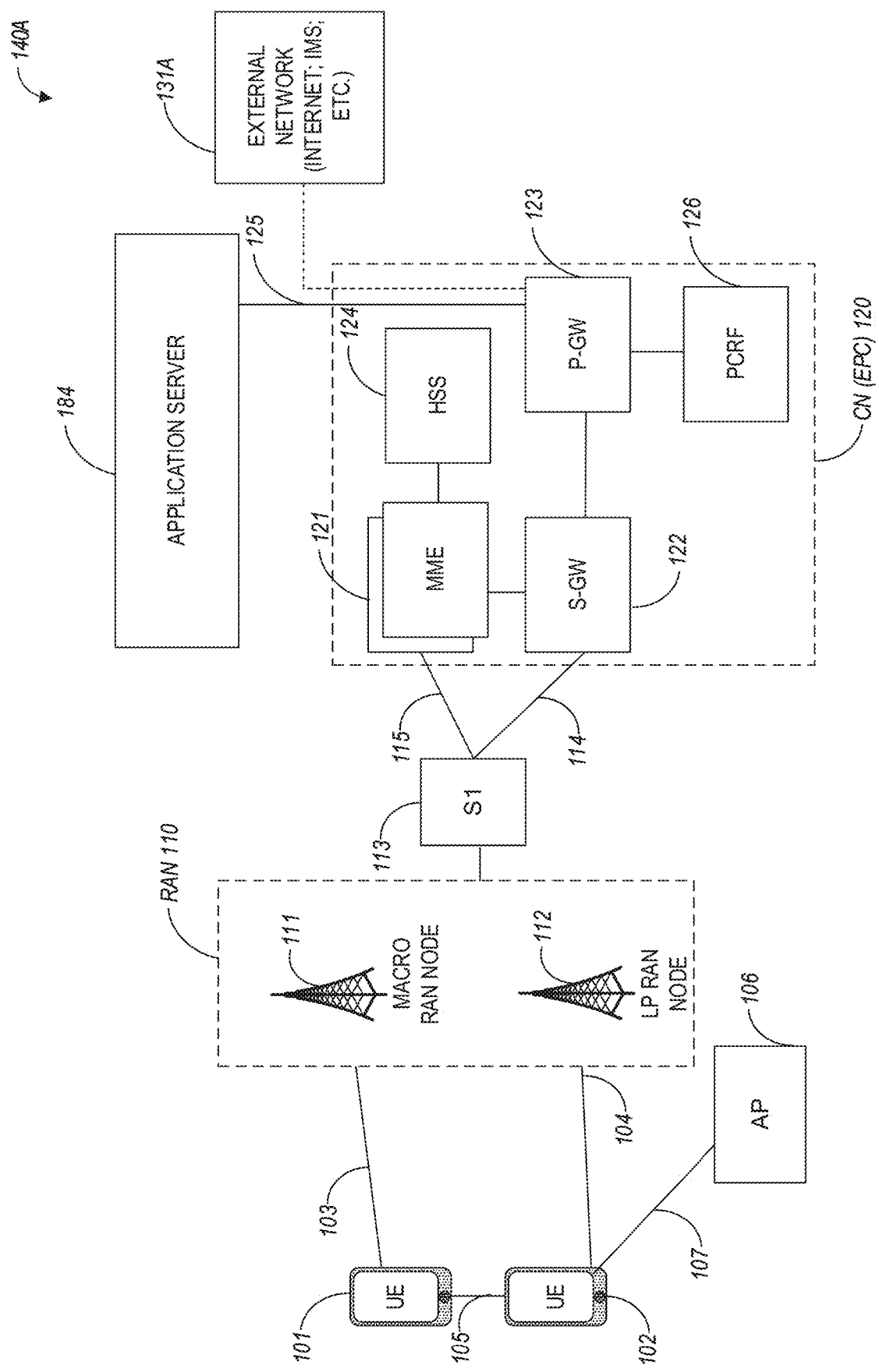
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum. (licensed)

shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFit) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an SI interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S interface 113 is split into two parts: the S-U interface 114, which carries traffic data between the RAN nodes 111 and 112 and the serving gateway (S-GW) 122, and the SI-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the SI interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018 December). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
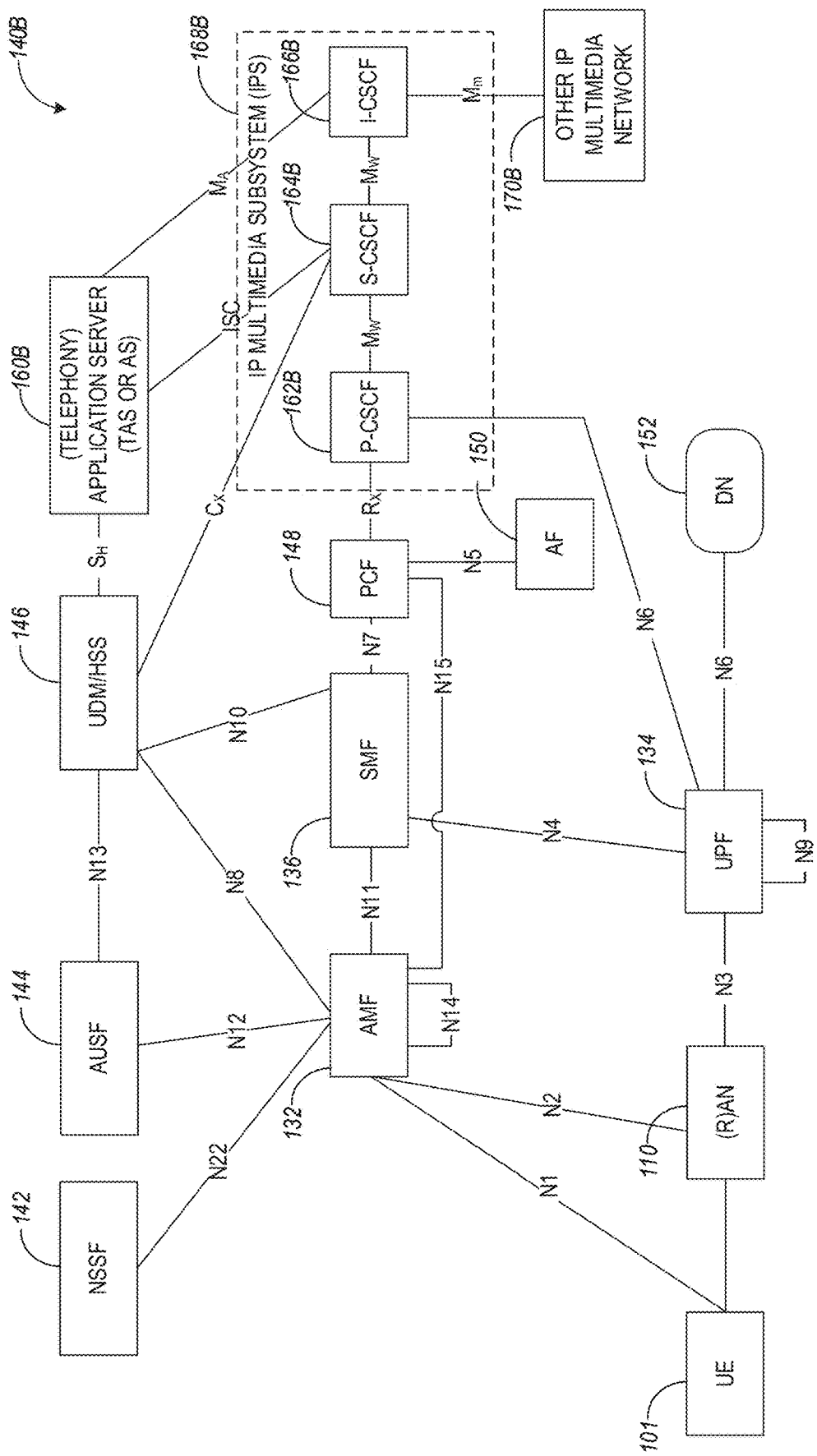
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and to mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown). N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
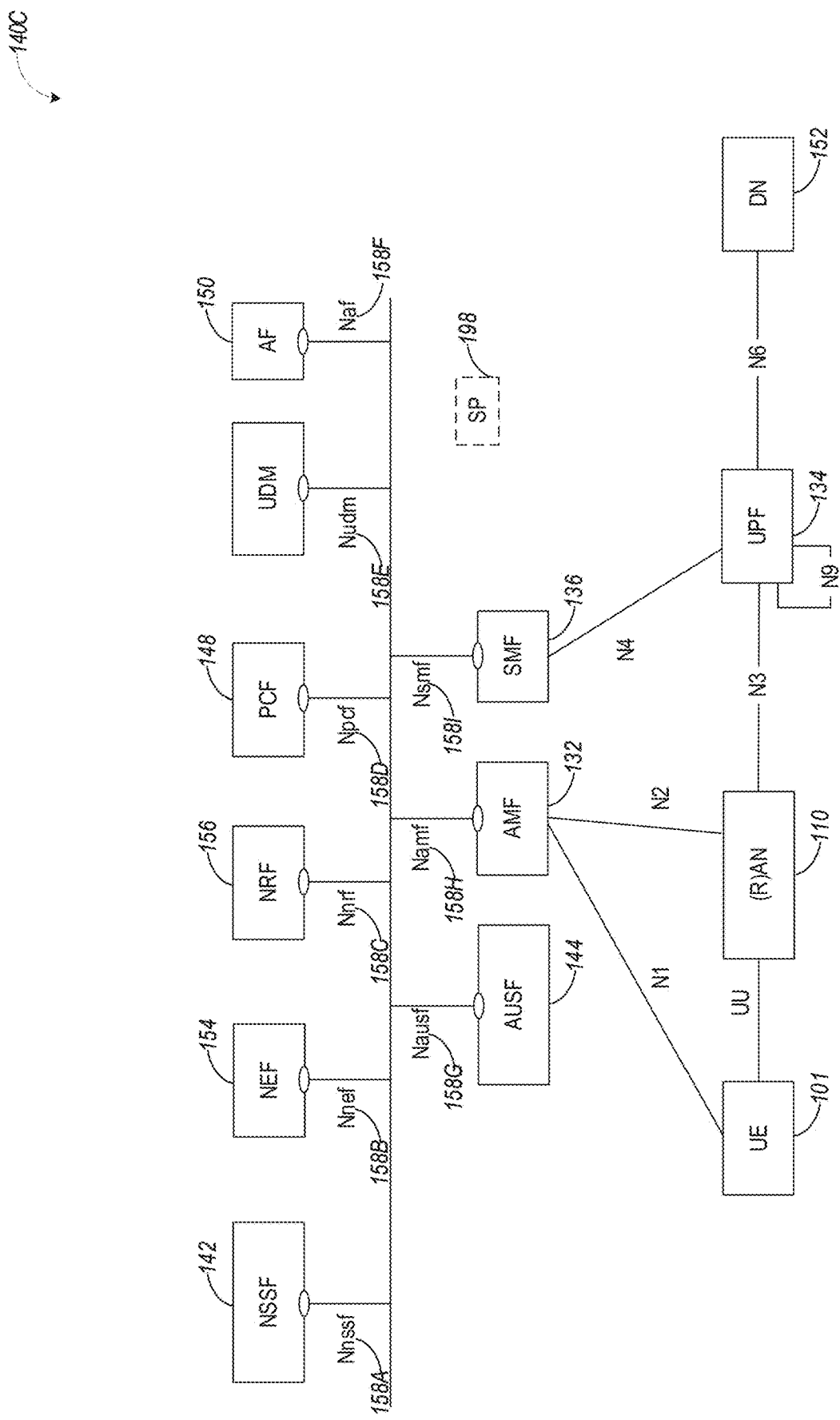

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE, a base station (e.g., any of the UEs or base stations discussed in connection with FIG. 1A-FIG. 1C), or any of the nodes in the Integrated Access and Backhaul (IAB) communication systems discussed in connection with FIGS. 2-6.

For an IAB node, the IAB distributed unit (DU) function may operate with multiple cells by using multiple component carriers (CCs) and/or multiple antenna panels. On the other hand, the co-located IAB mobile termination (MT) function can work under different CCs with carrier aggregation for a backhaul link. In some aspects, the IAB donor node central unit (CU) function and the parent node can be aware of the multiplexing capability between the MT and the DU functions (e.g., time-division multiplexing (TDM) is required or TDM is not required) of an IAB node for any {MT CC, DU cell} pair. Techniques discussed herein use signaling contents, signaling mechanisms, and detailed signaling methods to communicate an IAB node's multiplexing capability to the donor CU and the parent node.

Figure 2:
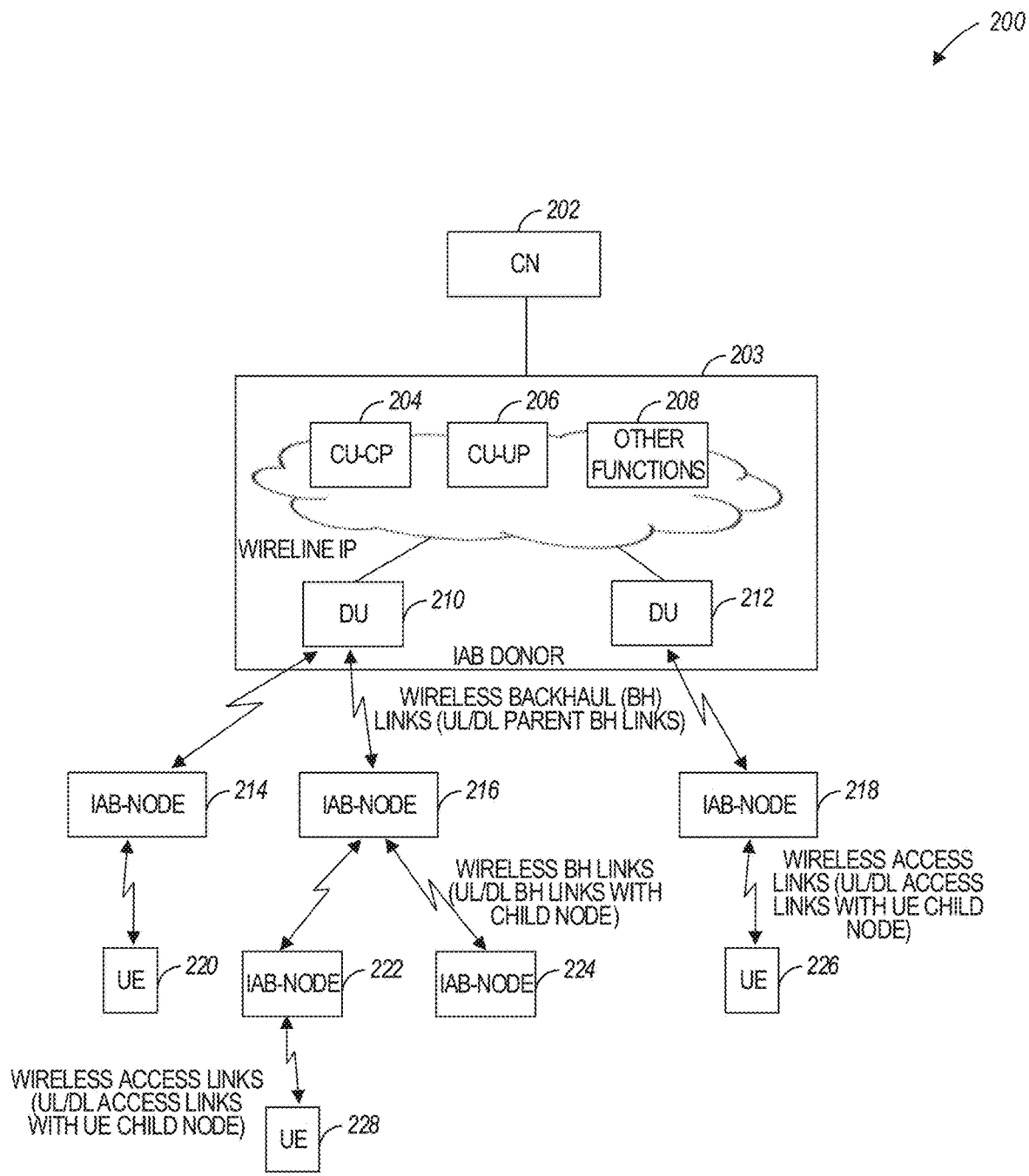
FIG. 2 illustrates a reference diagram of an IAB architecture, in accordance with some aspects.
Figure 3:
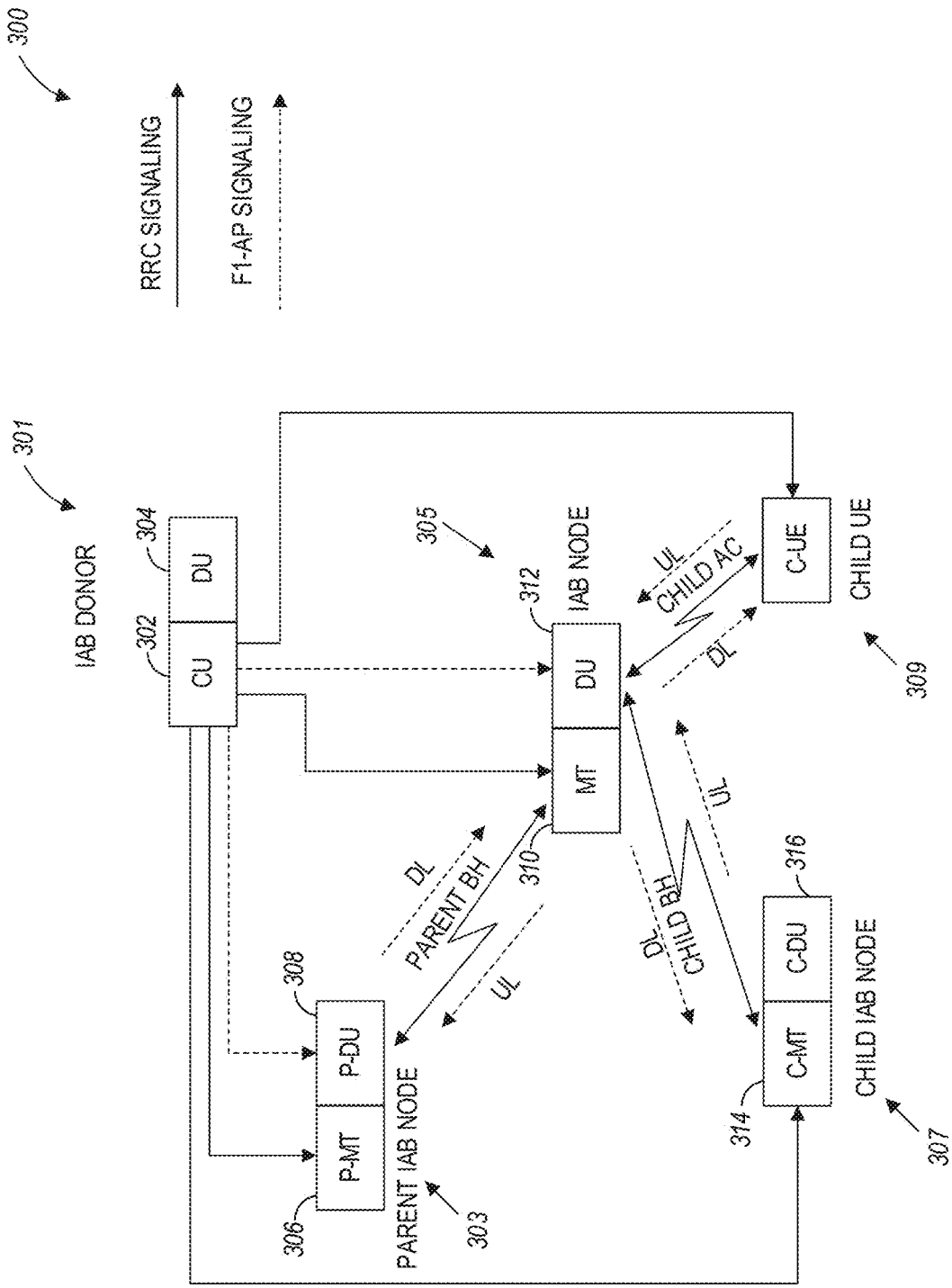
FIG. 3 illustrates a central unit (CU)-distributed unit (DU) split and signaling in an IAB architecture, in accordance with some aspects.

As illustrated in FIGS. 2-3, in an IAB network, an IAB node can connect to its parent node (an IAB donor or another IAB node) through a parent backhaul (BH) link, connect to a child user equipment (UE) through a child access (AC) link, and connect to a child IAB node through a child BH link.

FIG. 2 shows a reference diagram for IAB in a standalone mode, which contains one IAB donor node 203 and multiple IAB nodes (e.g., 214, 216, 218, 222, and 224). Referring to FIG. 2, the IAB architecture 200 can include a core network (CN) 202 coupled to an IAB donor node 203. The IAB donor node 203 can include control unit control plane (CU-CP) function 204, control unit user plane (CU-UP) function 206, other functions 208, and distributed unit (DU) functions 210 and 212. The DU function 210 can be coupled via wireless backhaul links to IAB nodes 214 and 216. The DU function 212 is coupled via a wireless backhaul link to IAB node 218. IAB node 214 is coupled to a UE 220 via a wireless access link, and IAB node 216 is coupled to IAB nodes 222 and 224. The IAB node 222 is coupled to UE 228 via a wireless access link. The IAB node 218 is coupled to UE 226 via a wireless access link.

Each of the IAB nodes illustrated in FIG. 2 can include a mobile termination (MT) function and a DU function. The MT function can be defined as a component of the mobile equipment and can be referred to as a function residing on an IAB-node that terminates the radio interface layers of the backhaul Uu interface toward the IAB-donor or other AB-nodes.

The IAB donor 203 is treated as a single logical node that comprises a set of functions such as gNB-DU, gNB-CU-CP 204, gNB-CU-UP 206, and potentially other functions 208. In deployment, the IAB donor 203 can be split according to these functions, which can all be either collocated or non-collocated as allowed by 3GPP NG-RAN architecture. IAB-related aspects may arise when such a split is exercised. In some aspects, some of the functions presently associated with the IAB-donor may eventually be moved outside of the donor in case it becomes evident that they do not perform IAB-specific tasks.

FIG. 3 illustrates a central unit (CU)-distributed unit (DU) split and signaling in an IAB architecture 300, in accordance with some aspects. Referring to FIG. 3, the IAB architecture 300 includes an IAB donor 301, a parent IAB node 303, an IAB node 305, a child IAB node 307, and a child UE 309. The IAB donor 301 includes a CU function 302 and a DU function 304. The parent IAB node 303 includes a parent MT (P-MT) function 306 and a parent DU (P-DU) function 308. The IAB node 305 includes an MT function 310 and a DU function 312. The child IAB node 307 includes a child MT (C-MT) function 314 and a child DU (C-DU) function 316.

As illustrated in FIG. 3. RRC signaling can be used for communication between the CU function 302 of the IAB donor 301 and the MT functions 306, 310, and 314, as well as between the CU function 302 and the child UE (C-UE) 309. Additionally, F1 access protocol (F1AP) signaling can be used for communication between the CU function 302 of the IAB donor 301 and the DU functions of the parent IAB node 303 and the IAB node 305.

As illustrated in FIGS. 2-3, multiple IAB nodes are connected to a donor node (DN) via a wireless backhaul. A DN or a parent IAB node needs to properly allocate resources for its child IAB node under the half-duplex constraint at the child IAB node. In some aspects, the time-frequency resource allocated to the parent link may be orthogonal to the time-frequency resource allocated to the child or access link.

Techniques discussed herein can be used for new signaling mechanisms for multiplexing capabilities notification in IAB networks (or other types of multi-hop networks).

As an IAB node needs to report its multiplexing types related to {MT CC, DU cell} pairs to the donor CU and the parent node, the first several signaling contents options are proposed. Then, three signaling mechanisms with detailed signaling methods regarding an IAB node's multiplexing capability to the donor CU and the parent DU are proposed as discussed hereinbelow.

Figure 4:
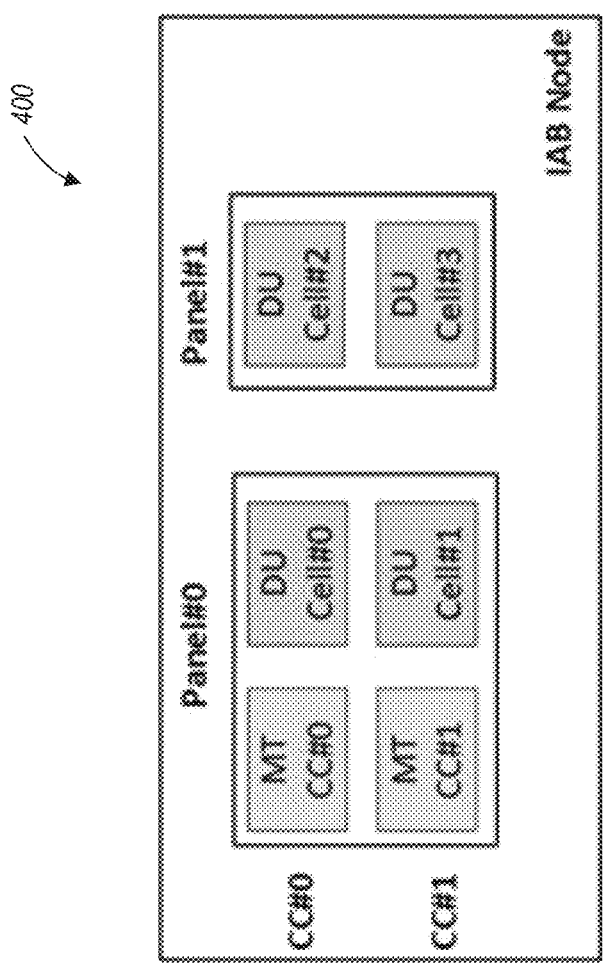
FIG. 4 illustrates an example IAB node with multiple mobile termination (MT) function component carriers (CCs) and distributed unit (DU) function cells which can be configured to operate using different antenna panels and different multiplexing techniques, in accordance with some aspects.

FIG. 4 illustrates an example IAB node 400 with multiple mobile termination (MT) function component carriers (CCs) and distributed unit (DU) function cells which can be configured to operate using different antenna panels and different multiplexing techniques, in accordance with some aspects.

For an IAB node (e.g., IAB node 400), the IAB DU may operate with multiple cells by using multiple component carriers (CCs) and/or multiple antenna panels (also referred to as "panels"). As an example in FIG. 4, an IAB DU can operate with four cells (Cell#0-Cell#3), where Cell#0 is with the component carrier (CC) #0 and Panel#0, Cell#1 is with CC#1 and Panel#0, Cell#2 is with CC#0 and Panel #1, and Cell#3 is with CC#1 and Panel #1. On the other hand, the co-located IAB MT can work under different CCs with carrier aggregation for the backhaul link. As shown in FIG. 4, the IAB MT can operate in CC#0 or CC#1.

In general, an IAB node with M MT CCs and N DU cells has M×N {MT CC, DU cell} pairs, and different CC-cell pairs may have different resource multiplexing types.

In some aspects, when the MT CC and the DU cell use the same carrier and the same panel, the multiplexing type of the CC-cell pair is a time-division multiplexing (TDM).

In some aspects, when the MT CC and the DU cell use the same carrier but different panels, the multiplexing type of the CC-cell pair can be spatial division multiplexing (SDM).

In some aspects, when the MT CC and the DU cell use different carriers but the same panel, the multiplexing type of the CC-cell pair can be frequency division multiplexing (FDM).

In some aspects, when the MT CC and the DU cell use different carriers and different panels, the multiplexing type of the CC-cell pair can be full duplexing (FD).

In FIG. 4, the multiplexing of {MT CC#0, DU Cell#0} and {MT CC#1, DU Cell#1} pairs is TDM; the multiplexing of {MT CC#0, DU Cell#1} and {MT CC#1, DU Cell#0} pairs can be FDM; the multiplexing of {MT CC#0, DU Cell#2} and {MT CC#1, DU Cell#3} pairs can be SDM: the multiplexing of {MT CC#0, DU Cell#3} and {MT CC#1, DU Cell#2} pairs can be FD.

In some aspects, the donor CU and the parent node can be aware of the multiplexing capability between MT and DU (e.g., TDM is required, or TDM is not required and other multiplexing techniques may be used) of an IAB node for any {MT CC, DU cell} pair. Proposed techniques provide signaling contents, signaling mechanisms, and detailed signaling methods regarding communication of an IAB node's multiplexing capability to the donor CU and the parent node.

Signaling Contents Regarding an IAB Node's Multiplexing Capability to the Donor CU and the Parent Node In some aspects, the signaling contents regarding an IAB node's multiplexing capability that need to be informed to the donor CU and the parent node can have the following options:

Option Contents-A: Enumerate {TDM required, TDM not required} for each {MT CC, DU Cell} pair.

Option Contents-B: Use one bit to indicate TDM required/TDM not required for each {MT CC, DU Cell} pair.

Option Contents-C: Enumerate {TDM, FDM, SDM, FD} for each {MT CC, DU Cell} pair.

Option Contents-D: Use four bits to indicate {TDM, FDM, SDM, FD} for each {MT CC, DU Cell} pair. For example, "1100" means TDM and FDM can be used.

Figure 5:
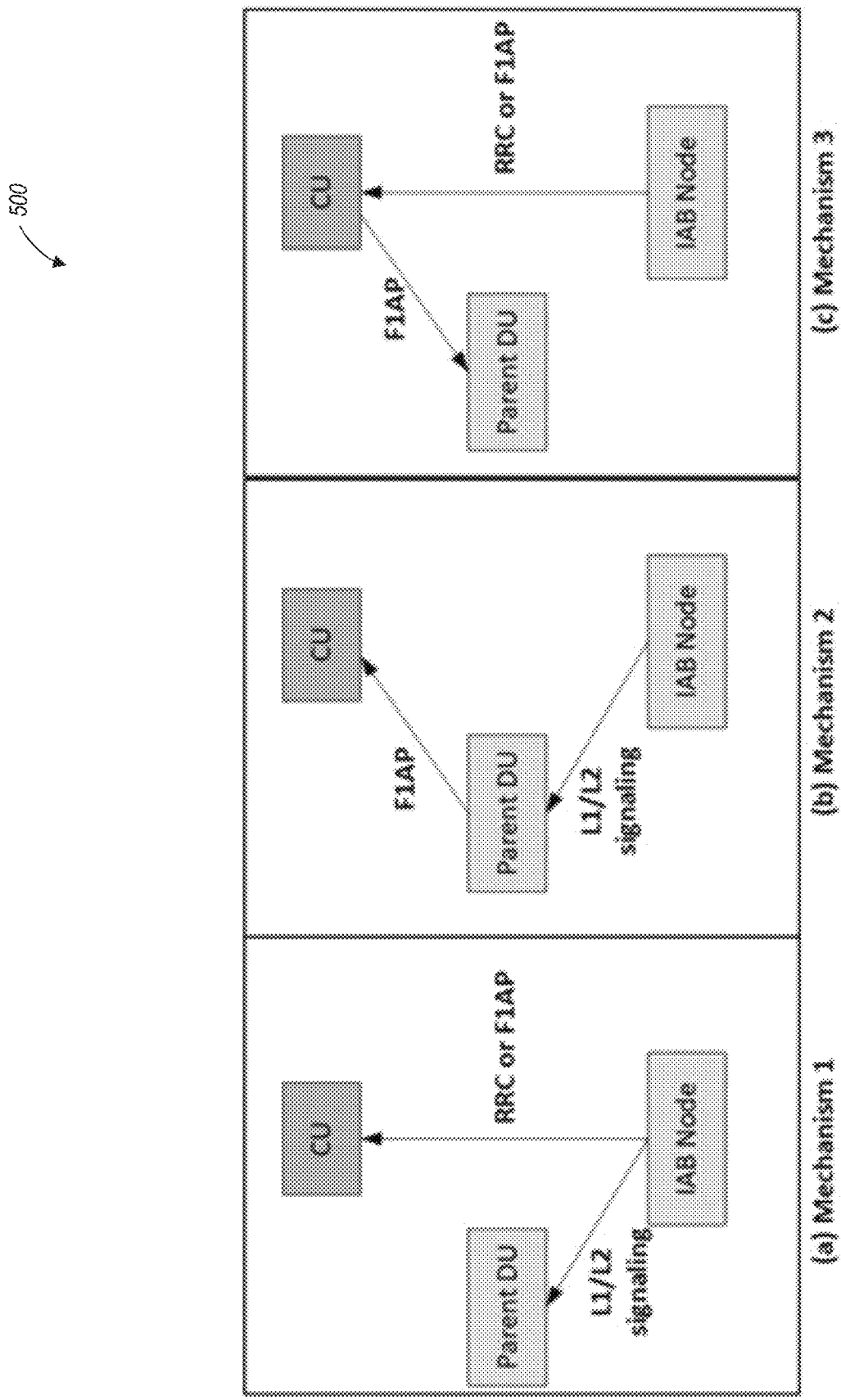
FIG. 5 illustrates different techniques for reporting IAB node multiplexing capabilities, in accordance with some aspects.

Signaling Methods Regarding an IAB Node's Multiplexing Capability to the Donor CU and the Parent Node FIG. 5 illustrates diagram 500 of different techniques (or mechanisms) for reporting IAB node multiplexing capabilities, in accordance with some aspects.

As an IAB node needs to report its multiplexing types related to {MT CC, DU cell} pairs to the donor CU and the parent node, the following mechanisms (also illustrated in FIG. 5) may be used:

Mechanism 1: the IAB node will report directly to the CU through RRC or F1AP signaling and report directly to the parent DU through layer 1 or layer 2 (L1/L2) signaling.

Mechanism 2: the IAB node will report directly to the parent DU through L1/L2 signaling, then the parent DU will report this information to the CU through F1AP signaling.

Mechanism 3: the IAB node will report directly to the CU through RRC or F1AP signaling, then the CU will inform this information to the parent DU through F1AP signaling.

Signaling Methods to the IAB Donor CU

In some aspects, an IAB node can report its multiplexing capability to the donor CU either through F1AP signaling from an IAB DU to the CU or RRC signaling from the IAB MT to the CU.

Method CU-1: Through F1AP signaling from an IAB DU to the CU

In this method, an IAB node's multiplexing capability is informed to the donor CU from an IAB DU (either the IAB node's parent DU as in Mechanism 2 or the current IAB DU as in Mechanisms 1/3) via F1AP signaling. In some aspects, there can be several F1AP protocol extension embodiment options as follows. In some aspects, embodiment options can be further extended to other F1AP messages (not limited to those options listed below).

Option CU-1 A: Enhancement of existing GNB-DU RESOURCE COORDINATION RESPONSE F1AP message may be used.

Option CU-1B: Enhancement of existing GNB-DU CONFIGURATION UPDATE F1AP message may be used.

Option CU-1C: Enhancement of existing GNB-CU CONFIGURATION UPDATE ACKNOWLEDGE F1AP message may be used.

Option CU-1D: Introduction of a new dedicated F1AP message may be used.

One embodiment of Option CU-1A is as follows. The embodiment of Option CU-1B/1C/1D can be defined in the same manner. In this embodiment, only the signaling contents Option Contents-C is applied to enumerate {TDM, FDM, SDM, FD} for each {MT CC, DU Cell} pair as an example. Other signaling contents options can be applied similarly.

In some aspects, an example F1AP message of GNB-DU RESOURCE COORDINATION RESPONSE is illustrated below in TABLE 1 and may be sent by a gNB-DU to a gNB-CU, to express the desired resource allocation for data traffic, as a response to the GNB-DU RESOURCE COORDINATION REQUEST and can include the IAB node's multiplexing capability information.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Request type | M | | ENUMERATED | | YES | reject |

| | | | | | |
|---|---|---|---|---|---|
| E-UTRA—NR Cell Resource Coordination Request Container | O | | OCTET STRING | Includes the X2AP E-UTRA-NR CELL RESOURCE COORDINATION REQUEST message as defined in subclause 9.1.4.24 in TS 36.423 [9]. (offer, execution, . . .) | YES reject |
| IAB Node Multiplexing Capability | O | | | | |
| >>List of {MT CC, DU Cell} pair | | | | List of applicable {MT CC, DU cell} pairs with their multiplexing capability | YES reject |
| >>>MT-DU pair ID | O | 0 . . . < maxnoMT DUpairs> | | Each {MT CC, DU Cell} ID index | — |
| >>>multipleximgType | O | | ENUMERATED (TDM, FDM, SDM, FD) | The multiplexing capability for one {MT CC, DU Cell} pair | — |

Method CU-2: Through RRC Signaling from an IAB MT to the CU

In this method, an IAB node's multiplexing capability is informed to the donor CU from the IAB MT (as in Mechanism 1/3). There can be several RRC signaling enhancement embodiment options as follows. In some aspects, the embodiment options can be further extended to other RRC messages (not limited to those options listed below).

Option CU-2A: Enhancement of existing RRC IE UECapabilityInformation may be used.

Option CU-2B: Enhancement of existing RRC IE UL-DCCH-MessageType may be used.

Option CU-2C: Enhancement of existing RRC IE UL-CCCH-MessageType may be used.

Option CU-2D: Enhancement of existing RRC IE UL-CCCH-MessageType may be used.

Option CU-2E: Enhancement of existing RRC IE UEAssistanceInformation may be used.

Option CU-2F: Introduce a new RRC message.

In some aspects, Option CU-2A can be configured as follows. The embodiment of Option CU-2B/2C/2D/2E/2F can be defined in the same manner. In this embodiment, only the signaling contents Option Contents-C is applied, which is to enumerate {TDM, FDM, SDM, FD} for each {MT CC, DU Cell} pair as an example. Other signaling contents options can be applied similarly.

In one embodiment of Option CU-2A, an additional field multiplexingCapability can be added to RRC IE UECapabilityInformation, and a new RRC IE of MultiplexingCapabilityPerPair can be created as provided in TABLE 2 below.

TABLE 2

```
UECapabilityInformation ::=     SEQUENCE {
rrc-TransactionIdentifier   RRC-TransactionIdentifier,
multiplexingCapability     SEQUENCE (SIZE (1..maxNrofMTDUPairs))
                                                OF
    MultiplexingCapability PerPair   OPTIONAL,
    criticalExtensions          CHOICE {
        ueCapabilityInformation         UECapabilityInformation-IEs,
        criticalExtensionsFuture      SEQUENCE { }
    }
}
MultiplexingCapabilityPerPair ::=    SEQUENCE {
mtdu-pairID             INTEGER (0..maxNrofMTDUPairs-1)
OPTIONAL,
    multiplexingCapabilityPerPair    ENUMERATED{TDM,FDM,SDM,FD}
OPTIONAL,
}
Field description:
multiplexingCapability
List of multiplexing capability for all {MT CC, DU Cell} pairs of an IAB
node.
mtdu-pairID
An ID to indicate a specific {MT CC, DU Cell} pair of an IAB node.
multiplexingCapabilityPerPair
The multiplexing capability for one pair of {MT CC, DU Cell}.
```

Signaling Methods to the Parent DU Function of the Parent IAB Node

In some aspects, an IAB node can report its multiplexing capability to the parent DU either through F1AP signaling from the donor CU or L1/L2 signaling from the IAB MT.

Method Parent-1: Through F1AP Signaling from the Donor CU to the Parent DU

In this method, an IAB node's multiplexing capability is informed from the donor CU to the parent IAB DU (as in Mechanism 3) via F1AP signaling. There can be several F1AP protocol extension embodiment options as follows. In some aspects, the embodiment options can be further extended to other F1AP messages (not limited to those options listed below).

Option Parent-1A: Enhancement of the existing GNB-DU RESOURCE COORDINATION REQUEST F1AP message may be used.

Option Parent-1B: Enhancement of the existing GNB-CU CONFIGURATION UPDATE F1AP message may be used.

Option Parent-1C: Introduction of a new dedicated F1AP message may be used.

In some aspects, the embodiment of Option Parent-1A/1B/1C can be defined similarly as the embodiment of Option CU-1A.

Method Parent-2: Through L1/L2 Signaling from the IAB MT to the Parent DU

In this method, an IAB node's multiplexing capability is informed from the IAB MT to the parent IAB DU (as in Mechanism 1/2) via L1/L2 signaling.

Option Parent-2A: Over UCI/PUCCH

For Option Parent-2A, regarding the transmission of an IAB node's multiplexing capability information over uplink control information (UCI) from the IAB MT to the parent IAB DU, either a new field is added in an uplink control information (UCI) format or a new UCI format may be used if the new field cannot be added in a current UCI format, and can be carried by physical uplink control channel (PUCCH). In some aspects, the PUCCH resource used to carry the new UCI type may be semi-statically configured or based on semi-persistent scheduling or dynamic scheduling.

Option Parent-2B: Over MAC CE/PUSCH

For Option Parent-2B, the transmission of IAB node's multiplexing capability information is over medium access control (MAC) control element (CE) carried by physical uplink shared channel (PUSCH), which can be either dynamic triggered or configured grant.

In some aspects, the logic channel ID (LCID) field which identifies the logical channel instance of the corresponding MAC service data unit (SDU) or the type of the corresponding MAC CE or padding for the uplink shared channel (UL-SCH) is described in the following TABLE 3. In some aspects, one of the reserved LCID (33-51) may be used to transmit the IAB node's multiplexing capability information from an IAB MT to its parent DU.

TABLE 3

| Index | LCID values |
| --- | --- |
| 0 | CCCH of size 64 bits |
| 1-32 | Identity of the logical channel |
| 33-51 | Reserved |
| 52 | CCCH of size 48 bits |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |

TABLE 3-continued

| Index | LCID values |
| --- | --- |
| 58 | C-RNTI |
| 59 | Short Truncated BSR |
| 60 | Long Truncated BSR |
| 61 | Short BSR |
| 62 | Long BSR |
| 63 | Padding |

Option Parent-2C: Over a New Defined L1 Channel

For Option Parent-2C, if an L1 channel will be added in an NR specification, the IAB node's multiplexing capability related information may be transmitted over a newly defined L1 channel.

Figure 6:
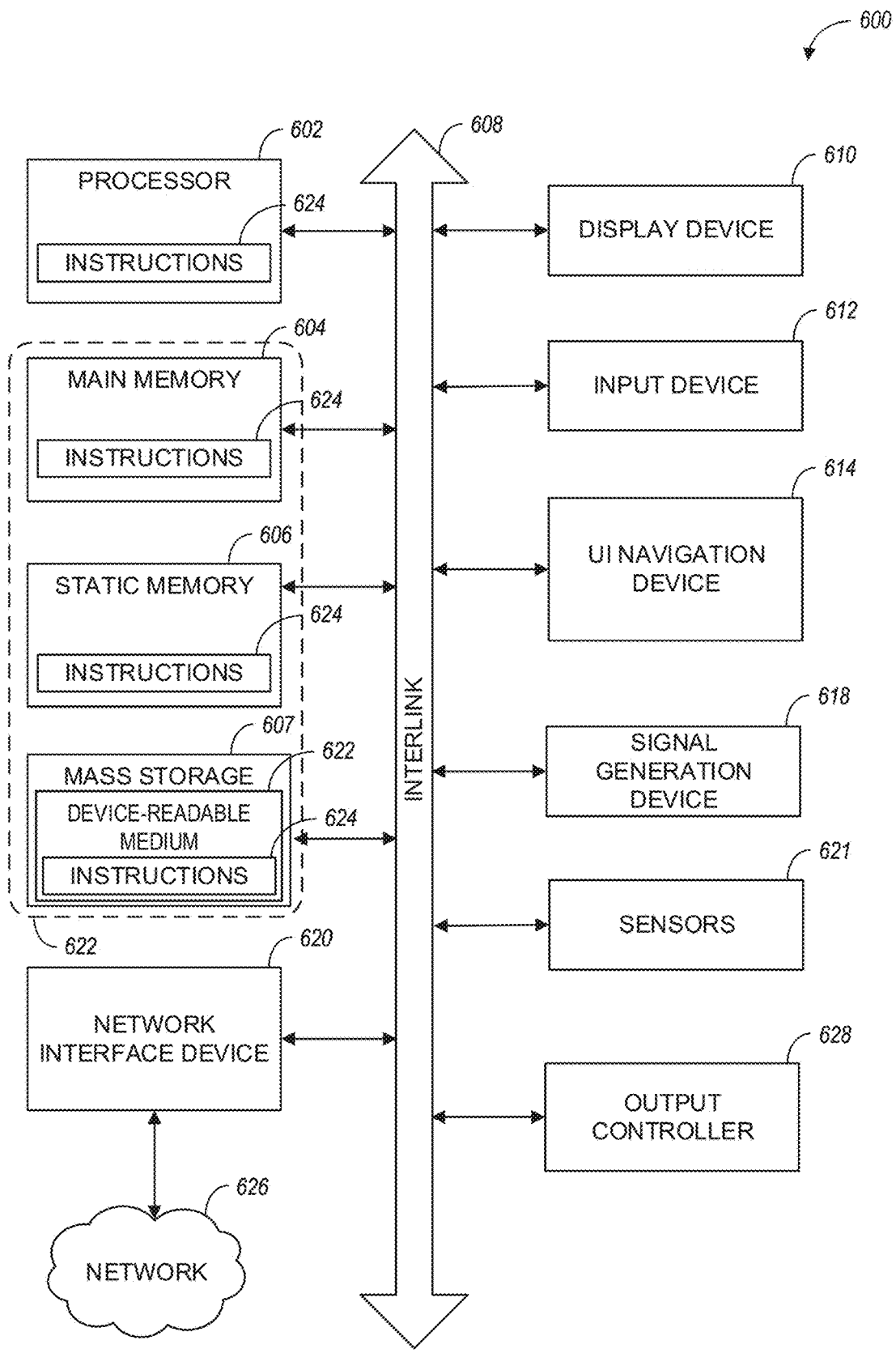
FIG. 6 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 6 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 600 may operate as a standalone device or may be connected (e.g., networked) to other communication devices.

Circuitry (e.g., processing circuitry) is a collection of circuits implemented in tangible entities of the device 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

In some aspects, the device 600 may operate as a standalone device or may be connected (e.g., networked) to other devices. In a networked deployment, the communication device 600 may operate in the capacity of a server communication device, a client communication device, or both in server-client network environments. In an example, the communication device 600 may act as a peer communication device in a peer-to-peer (P2P) (or other distributed) network environment. The communication device 600 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 600 may include a hardware processor 602 (e.g., a central processing unit (CPU), a graphics processing unit (GPU), a hardware processor core, or any combination thereof), a main memory 604, a static memory 606, and mass storage 607 (e.g., hard drive, tape drive, flash storage, or other block or storage devices), some or all of which may communicate with each other via an interlink (e.g., bus) 608.

The communication device 600 may further include a display device 610, an alphanumeric input device 612 (e.g., a keyboard), and a user interface (UI) navigation device 614 (e.g., a mouse). In an example, the display device 610, input device 612, and UI navigation device 614 may be a touchscreen display. The communication device 600 may additionally include a signal generation device 618 (e.g., a speaker), a network interface device 620, and one or more sensors 621, such as a global positioning system (GPS) sensor, compass, accelerometer, or another sensor. The communication device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 616 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store one or more instructions 624. The term "communication device-readable medium" is inclusive of the terms "machine-readable medium" or "computer-readable medium", and may include any medium that is capable of storing, encoding, or carrying instructions (e.g., instructions 624) for execution by the communication device 600 and that cause the communication device 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks: magneto-optical disks; Random Access Memory (RAM), and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multiple-output (SIMO), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding, or carrying instructions for execution by the communication device 600, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for use in an Integrated Access and Backhaul (IAB) node, the apparatus comprising:
   processing circuitry, wherein to configure the IAB node for multiplexing of operation of co-located distributed unit (DU) function and mobile termination (MT) function of the IAB node, the processing circuitry is to:
      encode a first configuration message for transmission to a central unit (CU) function of an IAB donor node via a first F1 application protocol (F1AP) interface, the first configuration message including multiplexing information for the DU function and the MT function of the IAB node, and the multiplexing information including a plurality of indications for a corresponding plurality of multiplexing operations associated with a cell of the DU function and a cell of the MT function of the IAB node; and
      perform reception or transmission of data between the MT function of the IAB node and a DU function of an IAB parent node during a multiplexing operation of the plurality of multiplexing operations, the reception or transmission of data during the multiplexing operation using time and frequency resources configured via a second configuration message communicated from the CU function of the IAB donor node to the DU function of the IAB parent node; and
   memory coupled to the processing circuitry and configured to store the multiplexing information.

2. The apparatus of claim 1, wherein the first configuration message is a gNB-DU Configuration Update message.

3. The apparatus of claim 1, wherein the second configuration message is communicated from the CU function of the IAB donor node to the DU function of the IAB parent node via a second F1AP interface.

4. The apparatus of claim 1, wherein the plurality of indications in the multiplexing information include:
   a first indication on whether the IAB node supports simultaneous reception by the DU function and the MT function;
   a second indication on whether the IAB node supports simultaneous transmission by the DU function and the MT function;
   a third indication on whether the IAB node supports simultaneous transmission by the DU function and reception by the MT function; and
   a fourth indication on whether the IAB node supports simultaneous reception by the DU function and transmission by the MT function.

5. The apparatus of claim 3, wherein the second configuration message is a gNB-DU Resource Configuration message communicated from the CU function of the IAB donor node to the DU function of the IAB parent node via the second F1AP interface.

6. The apparatus of claim 1, wherein the multiplexing information indicates whether time-division multiplexing (TDM) is required or not required for each {MT component carrier (CC), DU cell} pair of a plurality of {MT CC, DU cell} pairs of the IAB node.

7. The apparatus of claim 1, wherein the multiplexing information indicates one of time-division multiplexing (TDM), frequency division multiplexing (FDM), spatial division multiplexing (SDM), and full duplexing (FD) for each {MT component carrier (CC), DU cell} pair of a plurality of {MT CC, DU cell} pairs of the IAB node.

8. The apparatus of claim 1, further comprising transceiver circuitry coupled to the processing circuitry; and, one or more antennas coupled to the transceiver circuitry.

9. A non-transitory computer-readable storage medium that stores instructions for execution by one or more processors of an Integrated Access and Backhaul (IAB) node, the instructions to configure the IAB node for multiplexing of operation of co-located distributed unit (DU) function and mobile termination (MT) function of the IAB node, and to cause the IAB node to:
   encode a first configuration message for transmission to a central unit (CU) function of an IAB donor node via a first F1 application protocol (F1AP) interface, the first configuration message including multiplexing information for the DU function and the MT function of the IAB node, and the multiplexing information including a plurality of indications for a corresponding plurality of multiplexing operations associated with a cell of the DU function and a cell of the MT function of the IAB node; and
   perform reception or transmission of data between the MT function of the IAB node and a DU function of an IAB parent node during a multiplexing operation of the plurality of multiplexing operations, the reception or transmission of data during the multiplexing operation using time and frequency resources configured via a second configuration message communicated from the CU function of the IAB donor node to the DU function of the IAB parent node.

10. The non-transitory computer-readable storage medium of claim 9, wherein the first configuration message is a gNB-DU Configuration Update message.

11. The non-transitory computer-readable storage medium of claim 9, wherein the second configuration message is communicated from the CU function of the IAB donor node to the DU function of the IAB parent node via a second F1AP interface.

12. The non-transitory computer-readable storage medium of claim 9, wherein the plurality of indications in the multiplexing information include:
   a first indication on whether the IAB node supports simultaneous reception by the DU function and the MT function;
   a second indication on whether the IAB node supports simultaneous transmission by the DU function and the MT function;
   a third indication on whether the IAB node supports simultaneous transmission by the DU function and reception by the MT function; and
   a fourth indication on whether the IAB node supports simultaneous reception by the DU function and transmission by the MT function.

13. The non-transitory computer-readable storage medium of claim 11, wherein the second configuration message is a gNB-DU Resource Configuration message communicated from the CU function of the IAB donor node to the DU function of the IAB parent node via the second F1AP interface.

14. The non-transitory computer-readable storage medium of claim 9, wherein the multiplexing information indicates whether time-division multiplexing (TDM) is required or not required for each {MT component carrier (CC), DU cell} pair of a plurality of {MT CC, DU cell} pairs of the IAB node.

15. The non-transitory computer-readable storage medium of claim 9, wherein the multiplexing information indicates one of time-division multiplexing (TDM), frequency division multiplexing (FDM), spatial division multiplexing (SDM), and full duplexing (FD) for each {MT component carrier (CC), DU cell} pair of a plurality of {MT CC, DU cell} pairs of the IAB node.

16. An apparatus for use in a parent Integrated Access and Backhaul (IAB) node, the apparatus comprising:
    processing circuitry, wherein to configure a child IAB node for multiplexing of operation of co-located distributed unit (DU) function and mobile termination (MT) function of the child IAB node, the processing circuitry is to:
        decode a first configuration message received at a DU function of the parent IAB node from a central unit (CU) function of an IAB donor node via a first F1 application protocol (F1AP) interface, the first configuration message including multiplexing information for the DU function and the MT function of the child IAB node, and the multiplexing information including a plurality of indications for a corresponding plurality of multiplexing operations associated with a cell of the DU function and a cell of the MT function of the child IAB node; and
        perform reception or transmission of data between the DU function of the parent IAB node and the MT function of the child IAB node during a multiplexing operation of the plurality of multiplexing operations, the multiplexing information originating from the child IAB node and configured via a second configuration message communicated from the DU function of the child IAB node to the CU function of the IAB donor node; and
    memory coupled to the processing circuitry and configured to store the multiplexing information.

17. The apparatus of claim 16, wherein the second configuration message is a gNB-DU Configuration Update message.

18. The apparatus of claim 16, wherein the second configuration message is communicated from the DU function of the child IAB node to the CU function of the IAB donor node via a second F1AP interface.

19. The apparatus of claim 16, wherein the plurality of indications in the multiplexing information include:
    a first indication on whether the IAB node supports simultaneous reception by the DU function and the MT function;
    a second indication on whether the IAB node supports simultaneous transmission by the DU function and the MT function;
    a third indication on whether the IAB node supports simultaneous transmission by the DU function and reception by the MT function; and
    a fourth indication on whether the IAB node supports simultaneous reception by the DU function and transmission by the MT function.

20. The apparatus of claim 16, wherein the first configuration message is a gNB-DU Resource Configuration message communicated from the CU function of the IAB donor node to the DU function of the parent IAB node via the first F1AP interface.

* * * * *

UNITED STATES PATENT AND TRADEMARK OFFICE
CERTIFICATE OF CORRECTION

PATENT NO. : 11,792,891 B2  
APPLICATION NO. : 17/088684  
DATED : October 17, 2023  
INVENTOR(S) : Li et al.

Page 1 of 1

It is certified that error appears in the above-identified patent and that said Letters Patent is hereby corrected as shown below:

On the Title Page

Item (57), in "Abstract", in Column 2, Line 12, after "using", delete "to"

Signed and Sealed this
Fourteenth Day of January, 2025

Derrick Brent
*Acting Director of the United States Patent and Trademark Office*